Aug. 14, 1928.
F. B. KING
1,680,551
CHAIN HOOK
Filed Dec. 8, 1927
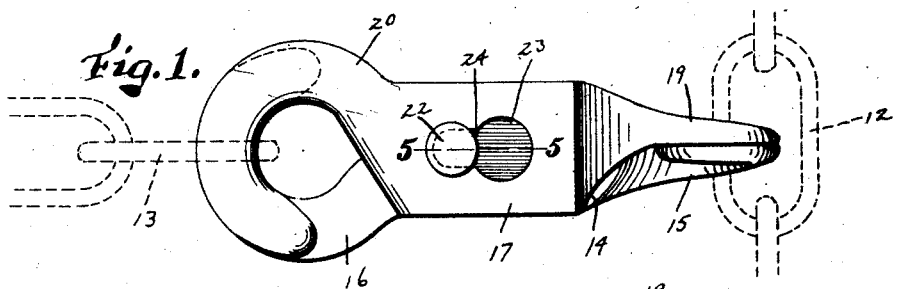
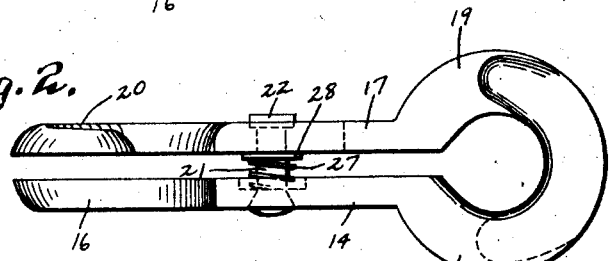
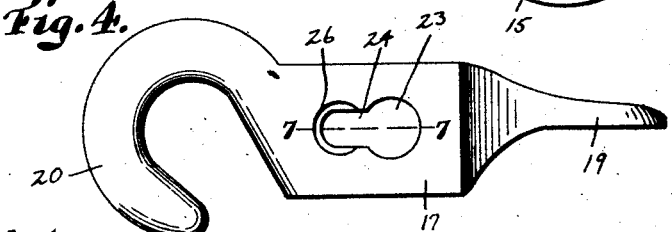
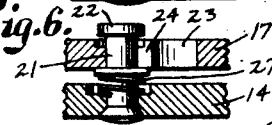
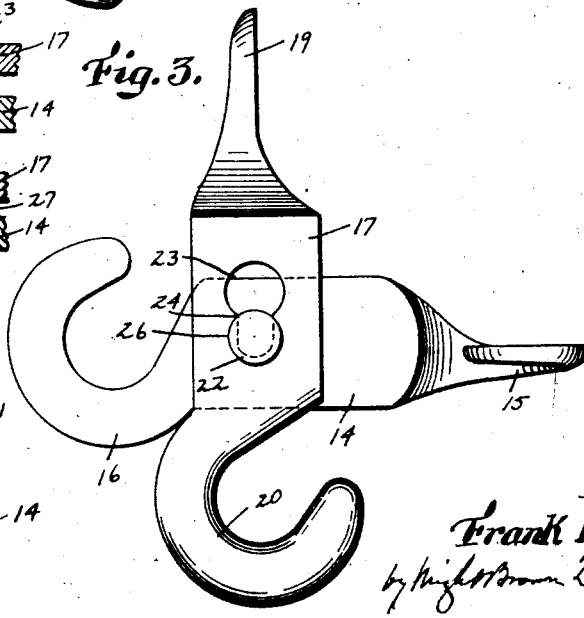
Inventor
Frank B. King Patented Aug. 14, 1928.

1,680,551

UNITED STATES PATENT OFFICE.

FRANK B. KING, OF WAKEFIELD, MASSACHUSETTS.

CHAIN HOOK.

Application filed December 8, 1927. Serial No. 238,525.

This invention is an improvement on the device disclosed by my Patent No. 1,584,307, granted May 11, 1926, for a device adapted for use in connecting an anti-skid chain which extends across the tread of a motor-vehicle wheel, with the anchoring or side chains which bear on opposite sides of the rim of the wheel and extend around the same.

The object is to provide a device, the members of which may be conveniently assembled and separated and are free from liability of being obstructed or rendered inoperative by accumulations of mud, ice, and rust.

Of the accompanying drawings forming a part of this specification—

Figures 1 and 2 are side views, taken from different points, showing a securing device embodying the invention, Figure 1 showing the device engaged with a link of an anti-skid chain, and with a link of a side chain.

Figure 3 is a side view, showing one member of the device swung crosswise of the other.

Figure 4 is a side view of one of the members.

Figure 5 is a fragmentary section on line 5—5 of Figure 1.

Figure 6 is a view similar to Figure 5, showing one member pressed toward the other.

Figure 7 is a fragmentary section on line 7—7 of Figure 4.

Figure 8 is a view similar to a portion of Figure 5, showing only one of the members.

The same reference characters indicate the same parts in all of the figures.

The figures show the device considerably enlarged.

In the drawings, 12 designates a link of a side chain, which may be understood to be one of two chains located at opposite sides of the rim of a rubber-tired motor-vehicle wheel, each chain being continuous and forming a circle corresponding to the rim, so that the end links 13 of any desired number of anti-skid chains extending across the tread of the tire may be connected with the anchoring chains by the corresponding device hereinafter described.

It will be understood also that each anti-skid chain is of a length sufficient to enable it to extend from one side of the wheel rim, across the tire tread and to the opposite side of the wheel rim.

The securing device in which my invention is embodied is designed to connect the end links 13 of an anti-skid chain, with corresponding links 12 of two anchoring chains, there being two of these devices for each anti-skid chain, the devices being detachably engaged with the end links 13 of an anti-skid chain, and with suitable links 12 of two anchoring chains.

My improved securing device comprises an elongated member 14, having open hooks 15 and 16, at its opposite ends, arranged at right angles with each other, and an elongated member 17, having open hooks 19 and 20, at its opposite ends, arranged at right angles with each other.

Engaged with and projecting from the member 14, is a hinge pintle including a cylindrical body portion 21, and an enlargement or head 22 at the outer end of the body portion.

The member 17 is provided with an elongated keyhole-shaped orifice including a larger portion 23, formed to receive the pintle and its head, and a smaller portion 24, formed to receive only the body portion 21 of the pintle.

The arrangement is such that the members may be pivotally connected, by first inserting the pintle in the larger orifice portion 23, as indicated by dotted lines in Figure 7, and then moving it into the smaller portion 24, as shown by Figure 5, thereby causing the head 22 to prevent separation of the members and establishing a pivotal connection between the members, the member 17 being adapted to turn on the pintle.

The members are separable when the pintle is moved into the larger portion 23 of the orifice.

To prevent accidental movement of the pintle into the larger portion 23, I countersink the outer end of the smaller portion 24, to form therein an arcuate shoulder 26, adapted to engage the pintle head 22, as indicated by Figures 1 and 3, and confine the pintle in said smaller portion, a spring 27 supporting a washer 28 being seated in a recess 29, in the member 14, and acting to yieldingly confine the arcuate shoulder 26 in engagement with the pintle head, as shown by Figures 2 and 5.

The members 14 and 16 are yieldingly pressed and spaced apart by the spring, as shown by Figure 2, so that the member 17 may be pressed toward the member 14 to disengage the pintle head 22 from the shoulder 26, as shown by Figure 6, thus permitting the separation of the members by moving the pintle portion 21 into the larger orifice portion 23, and then withdrawing the pintle from the orifice.

To engage the device with a link 12, the members are turned to separate the hooks 15 and 19, as shown by Figure 4, so that the link may be inserted between said hooks, and then engaged with the hooks by a suitable manipulation of the hooks and link.

To engage the device with a link 13, the link is inserted between the separated hooks 16 and 20, and then engaged with said hooks by a suitable manipulation of the link. The member 17 is so loosely engaged with the pintle that it may be tipped or inclined lengthwise on the pintle, to widen the space between the hooks 16 and 20, and permit an easy insertion of the link.

The hooks 15 and 19 constitute an eye which is divisible by a swinging movement of the members, and the hooks 16 and 20 constitute an eye which is divisible by a sliding movement of the members, the eyes being in different planes, so that one is substantially at right angles to the other.

After the links are engaged with said divisible eyes, the links prevent swinging movements of the members relative to each other.

It will be seen that the members may be operatively connected, as described, no tools being required, and that they may be quickly separated.

It will also be seen that accumulations of mud and ice between the members may be readily removed, and that the construction is such that the device can not be rendered inoperative by the rusting of its parts. When the device is not in use, and the members are connected as shown by Figures 1 and 2, there is no liability of accidental separation of the members.

I claim:

A securing device for anti-skid chains, comprising two elongated separable members, each having open hooks at its opposite ends, a hinge pintle engaged with one of said members and projecting therefrom, said pintle including a cylindrical body portion and an enlarged head at the outer end of the body portion, the other member having an elongated keyhole-shaped orifice including a larger portion formed to receive the pintle and its head, and a smaller portion formed to receive only the body portion of the pintle, the reduced portion of the orifice being countersunk at one end, to form an arcuate shoulder adapted to engage the pintle head and confine the pintle in said reduced portion, and a spring interposed between the members and normally pressing the same apart, said spring yieldingly confining the arcuate shoulder in engagement with the pintle head, the arrangement being such that the members may be pivotally connected by first inserting the pintle in the larger portion of the orifice, and then moving it into the smaller portion, thereby causing the pintle head to prevent separation of the members, and establishing a pivotal connection therebetween, the members being separable when the pintle is moved into the enlarged portion of the orifice, the hooks forming closed eyes arranged in different planes, one eye being divisible by a swinging movement, and the other by a sliding movement.

In testimony whereof I have affixed my signature.

FRANK B. KING.